(12) United States Patent
Hong et al.

(10) Patent No.: US 10,113,916 B2
(45) Date of Patent: Oct. 30, 2018

(54) TEMPERATURE SENSING APPARATUS FOR HEAT EXCHANGER

(71) Applicant: LG ELECTRONICS INC., Seoul (KR)

(72) Inventors: Taehwa Hong, Seoul (KR); Hyuksoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 392 days.

(21) Appl. No.: 14/947,962

(22) Filed: Nov. 20, 2015

(65) Prior Publication Data

US 2016/0153839 A1 Jun. 2, 2016

(30) Foreign Application Priority Data

Dec. 2, 2014 (KR) ........................ 10-2014-0170158

(51) Int. Cl.
*G01K 1/14* (2006.01)
(52) U.S. Cl.
CPC .................................. *G01K 1/143* (2013.01)
(58) Field of Classification Search
CPC  G01K 1/14; G01K 1/08; G01K 13/02; G01K 13/00; G01K 1/143;
(Continued)

(56) References Cited

U.S. PATENT DOCUMENTS 5,141,335 A * 8/1992 Wannamaker ......... G01K 1/143
136/232
5,711,607 A * 1/1998 Bernstein ............. B01J 19/0046
374/179
(Continued)

FOREIGN PATENT DOCUMENTS

JP         60-128183      8/1985
JP         H07-146041 A   6/1995
(Continued)

OTHER PUBLICATIONS

Korean Office Action dated Sep. 29, 2015 issued in Application No. 10-2014-0170158.
(Continued)

*Primary Examiner* — Gail Kaplan Verbitsky
(74) *Attorney, Agent, or Firm* — KED & Associates, LLP

(57) ABSTRACT

A temperature sensing apparatus for a heat exchanger may include a sensor bracket installed at an outer circumferential surface of a refrigerant pipe forming the heat exchanger, and a temperature sensor accommodated at an inside of the sensor bracket, and configured to be in contact with the outer circumferential surface of the refrigerant pipe, when the sensor bracket is installed at the refrigerant pipe, to sense a surface temperature of the refrigerant pipe. The sensor bracket includes a bracket body rounded to surround the outer circumferential surface of the refrigerant pipe, a sensor accommodating groove formed at an inner surface of the bracket body to be recessed and in which the temperature sensor is accommodated, and a pipe holder configured to protrude from an end of the bracket body and to be in close contact with the outer circumferential surface of the refrigerant pipe.

8 Claims, 7 Drawing Sheets

(58) Field of Classification Search
CPC ......... G01K 2013/026; G01K 2201/00; G01K 2207/00; G01K 7/023
See application file for complete search history.

(56) References Cited

U.S. PATENT DOCUMENTS

| | | | | |
|---|---|---|---|---|
| 6,158,886 | A * | 12/2000 | Dutcher | G01K 1/143 374/147 |
| 6,334,707 | B1 * | 1/2002 | Ku | G01K 1/143 374/147 |
| 6,550,962 | B1 * | 4/2003 | Yang | F16L 3/04 24/458 |
| 6,779,919 | B1 * | 8/2004 | Staniforth | G01K 1/143 248/231.51 |
| 6,814,486 | B2 * | 11/2004 | Sidoni | G01K 1/143 374/147 |
| 7,354,193 | B2 * | 4/2008 | Hsu | G01K 1/143 136/221 |
| 7,748,224 | B2 * | 7/2010 | Grimm | B60H 1/00792 374/209 |
| 9,784,506 | B2 * | 10/2017 | Teraki | F28F 9/013 |
| 9,816,867 | B2 * | 11/2017 | Ishikawa | G01K 7/22 |
| 2008/0008227 | A1 * | 1/2008 | Jang | G01K 1/14 374/208 |
| 2009/0190630 | A1 * | 7/2009 | Hong | G01K 1/143 374/208 |

FOREIGN PATENT DOCUMENTS

| | | | |
|---|---|---|---|
| JP | 3312198 B2 * | 8/2002 | ............. F16L 57/00 |
| KR | 20-2001-0001481 | 1/2001 | |
| KR | 10-2009-0105092 | 10/2009 | |

OTHER PUBLICATIONS

Korean Office Action dated Apr. 26, 2016 issued in Application No. 10-2014-0170158.
Korean Notice of Allowance dated Oct. 28, 2016 issued in Application No. 10-2014-0170158.

\* cited by examiner

TEMPERATURE SENSING APPARATUS FOR HEAT EXCHANGER

CROSS-REFERENCE TO RELATED APPLICATION

This application claims priority under 35 U.S.C. § 119 to Korean Application No. 10-2014-0170158, filed in Korea on Dec. 02, 2014, whose entire disclosure is hereby incorporated by reference.

BACKGROUND

1. Field

The present disclosure relates to an apparatus for measuring a temperature of a refrigerant flowing inside a heat exchanger.

2. Background

A refrigerant circulating system includes a compressor, a condenser, an expansion valve and an evaporator. A refrigerant is compressed into a high temperature and high pressure gaseous refrigerant by the compressor. Thereafter, the refrigerant is phase-changed into a high temperature and high pressure liquefied refrigerant by the condenser. The refrigerant which has passed through the condenser is changed into a low temperature and low pressure two-phase refrigerant by the expansion valve. The two-phase refrigerant is evaporated into a low temperature and low pressure gaseous refrigerant while passing through the evaporator, and is then introduced into the compressor.

To control the refrigeration system, a temperature of the refrigerant flowing through the condenser or the evaporator is measured. In general, there are many cases of measuring a temperature of a space in which the condenser or the evaporator is installed. Since there is a temperature difference of the refrigerant flowing through the condenser or the evaporator, temperature measuring may be inaccurate.

In particular, the liquefied refrigerant and the gaseous refrigerant flow together through a refrigerant pipe included in the evaporator, and the liquefied refrigerant flows along a lower surface of the refrigerant pipe, and the gaseous refrigerant is pushed to an upper side of the refrigerant pipe. The temperature of the refrigerant may or may not be easily or accurately detected according to an installation position of a temperature sensor at the refrigerant pipe.

In the case of a structure in which a temperature sensor is directly in contact with the refrigerant pipe to detect the temperature of the refrigerant, there is a problem in that the temperature sensor may not be maintained in a stably attached state to the refrigerant pipe.

BRIEF DESCRIPTION OF THE DRAWINGS

Embodiments will be described in detail with reference to the following drawings in which like reference numerals refer to like elements, and wherein.

DETAILED DESCRIPTION

Figure 1:
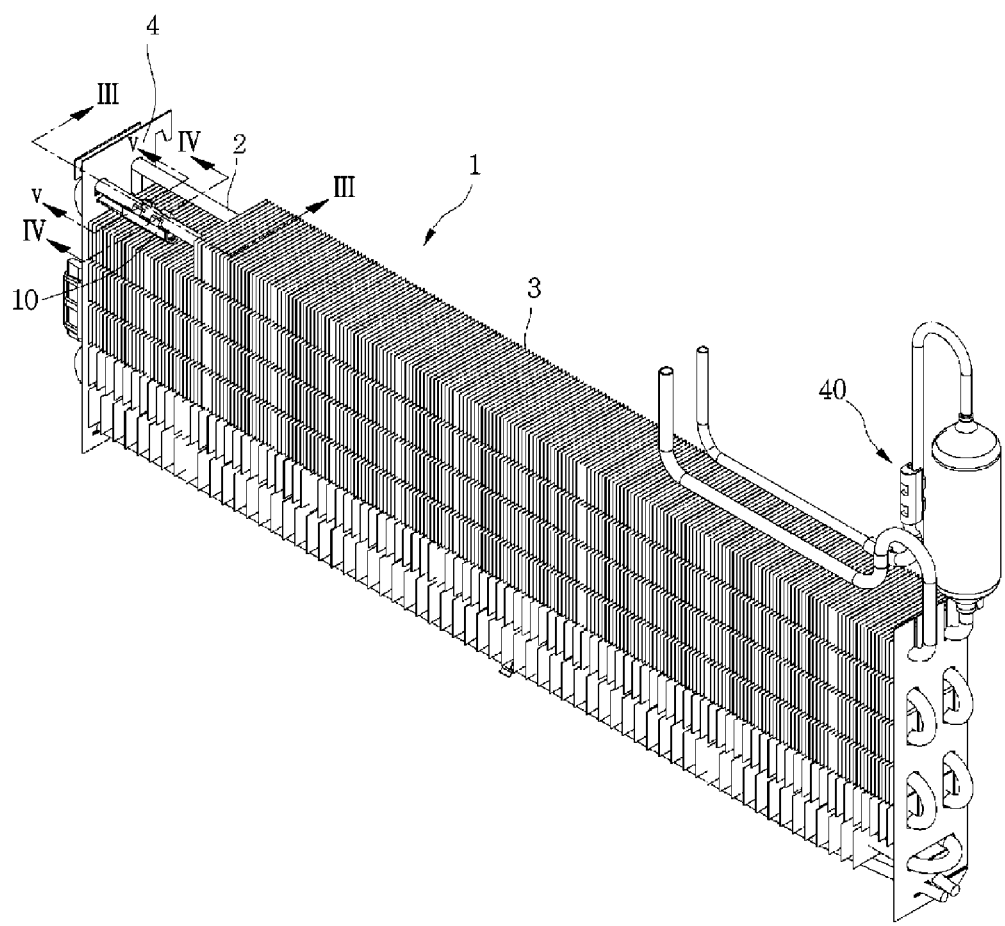
FIG. 1 is a perspective view of a heat exchanger with a temperature sensing apparatus according to an embodiment of the present disclosure.

Referring to FIG. 1, temperature sensing apparatuses 10 and 40 according to an embodiment of the present disclosure may be installed at a fin-tube shaped heat exchanger. Specifically, a heat exchanger 1 may include a frame 4, a refrigerant pipe 2 through which a refrigerant flow, and a heat exchanger fin 3. A plurality of heat exchanger fins 3 may be upright and disposed in an extension direction of the refrigerant pipe 2. The refrigerant pipe 2 may pass through the heat exchanger fins 3 and then may windingly extend through the fin 3. The frame 4 serves to support the refrigerant pipe 2.

The refrigerant pipe 2 may extend horizontally and vertically. The temperature sensing apparatus 10 may be installed at an outer circumferential surface of the horizontally extending refrigerant pipe 2, and the temperature sensing apparatus 40 may be installed at an outer circumferential surface of the vertically extending refrigerant pipe 2.

Figure 2:
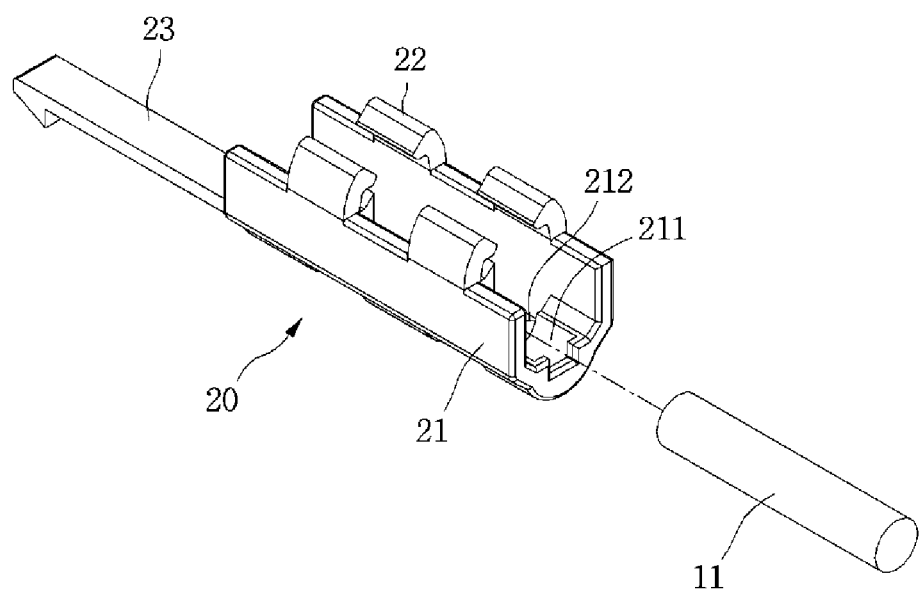
FIG. 2 is a perspective view of a temperature sensing apparatus according to a first embodiment of the present disclosure.

Referring to FIG. 2, the temperature sensing apparatus 10 according to the first embodiment of the present disclosure may include a temperature sensor 11 installed at the outer circumferential surface of the refrigerant pipe 2, and a sensor bracket 20 to accommodate the temperature sensor 11 and attached at the outer circumferential surface of the refrigerant pipe 2. The temperature sensor 11 may have a cylindrical rod shape. The sensor bracket 20 allows the temperature sensor 11 to be attached and fixed at the outer circumferential surface of the refrigerant pipe 2.

The sensor bracket 20 may include a bracket body 21 having a U-shaped cross section, a plurality of pipe holders 22 protruding from an upper end of the bracket body 21 to grasp the outer circumferential surface of the refrigerant pipe 2, and a fixing hook 23 extending from a front end of the bracket body 21 to be hooked to the frame 4. The sensor bracket 20 may be installed under the refrigerant pipe 2.

The pipe holder 22 is bent in a hook shape. An end of the pipe holder 22, which is in contact with the outer circumferential surface of the refrigerant pipe 2, may be disposed at an upper side of a center of the refrigerant pipe 2, and may prevent separation of the sensor bracket 20 from the refrigerant pipe 2 by its own weight.

A sensor accommodating groove 211 may be formed at an inside of the bracket body 21 by a recess and accommodates the temperature sensor 11. One or a plurality of drain holes 212 may be formed at a bottom of the bracket body 21. The condensated water or water flowing along a surface of the refrigerant pipe 2 or the temperature sensor 11 may be discharged to an outside through the drain hole 212 to prevent temperature sensing of the water.

Figure 3:
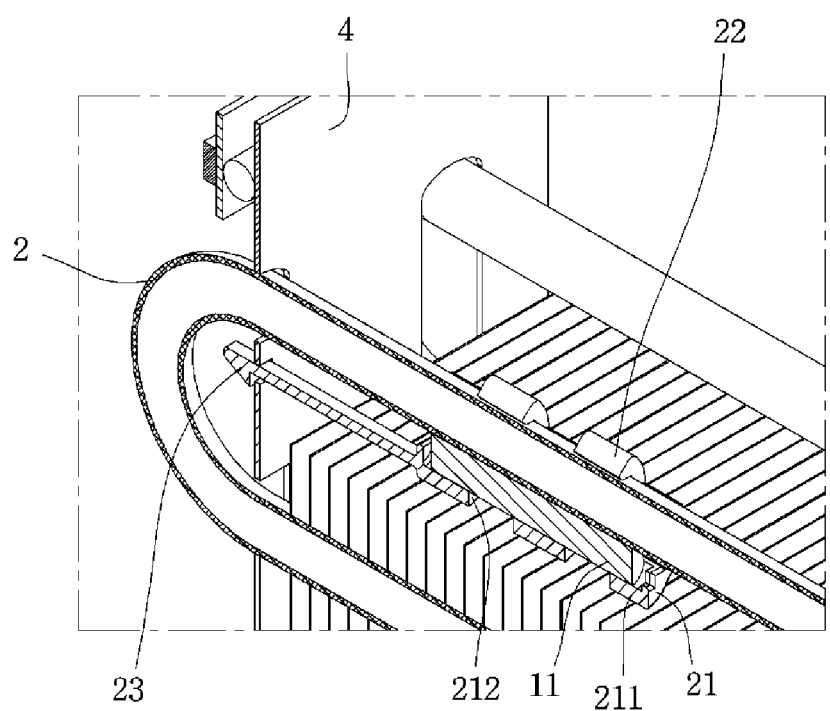
FIG. 3 is a longitudinal cross-sectional view taken along line III-III of FIG. 1.

Referring to FIG. 3, the refrigerant pipe 2 passes through the frame 4, and extends windingly to form a meandering line. The refrigerant pipe 2 may be supported by the frame 4. The fixing hook 23 also passes through and hooks onto the frame 4. A hole through which the fixing hook 23 passes is formed at the frame 4, and an end of the fixing hook 23 passes through the hole to latch onto an outer surface of the frame 4. While being attached to the outer circumferential surface of the refrigerant pipe 4, the hook 23 prevents rotation of the bracket 23 in a circumferential direction of the pipe 4.

Figure 4:
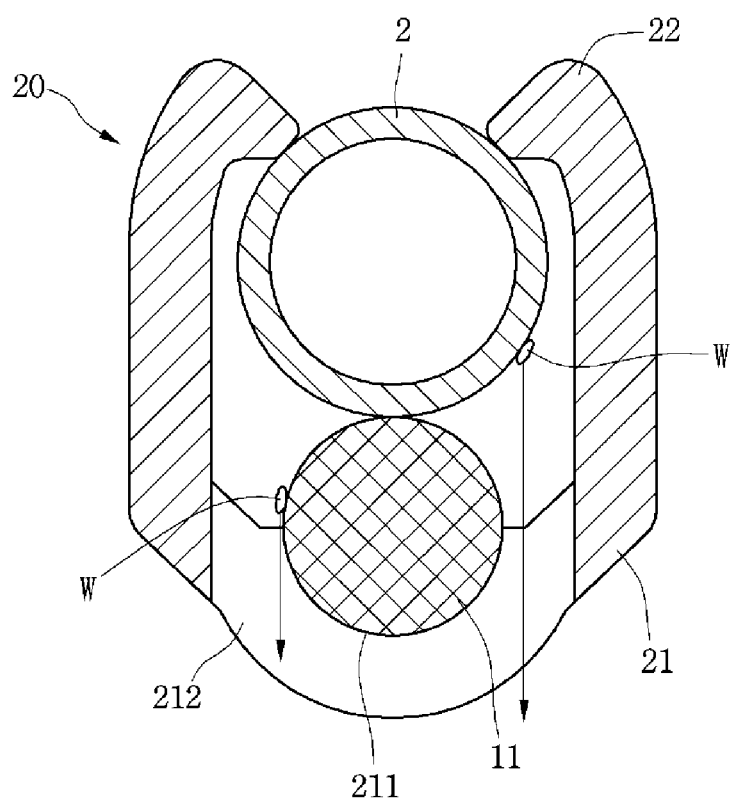
FIG. 4 is a longitudinal cross-sectional view taken along line IV-IV of FIG. 1.
Figure 5:
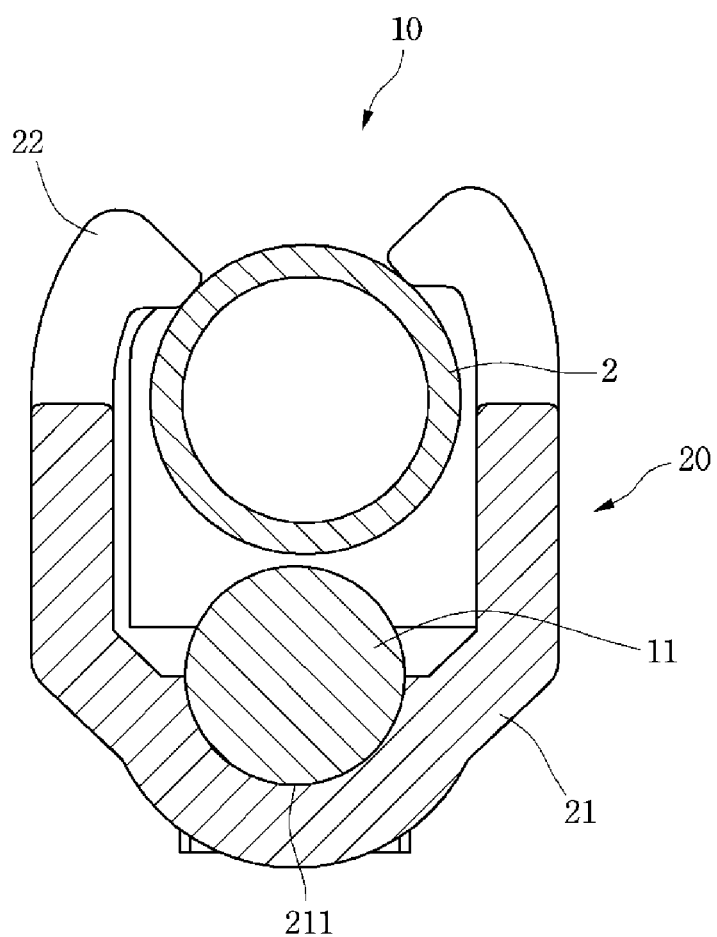
FIG. 5 is a longitudinal cross-sectional view taken along line V-V of FIG. 1.

Referring to FIGS. 4 and 5, when the sensor bracket 20 is installed at the outer circumferential surface of the refrigerant pipe 2, the temperature sensor 11 is in linear contact with the outer circumferential surface of the refrigerant pipe 2. The plurality of pipe holders 22 which extend from the upper end of the bracket body 21 are hooked on the outer circumferential surface of the refrigerant pipe 2. And as described above, since the end of the pipe holder 22 is located at an upper side of a horizontal line passing the center of the refrigerant pipe 2, the sensor bracket 20 is prevented from falling off of the refrigerant pipe 2 due to its own weight.

The water W formed on the outer circumferential surface of the refrigerant pipe 2 or the temperature sensor 11 is discharged to an outside of the sensor bracket 20 through the drain hole 212. A possibility in which a water film is formed on a contact portion between the refrigerant pipe 2 and the temperature sensor 11 or the contact portion is frozen may be minimized.

Figure 6:
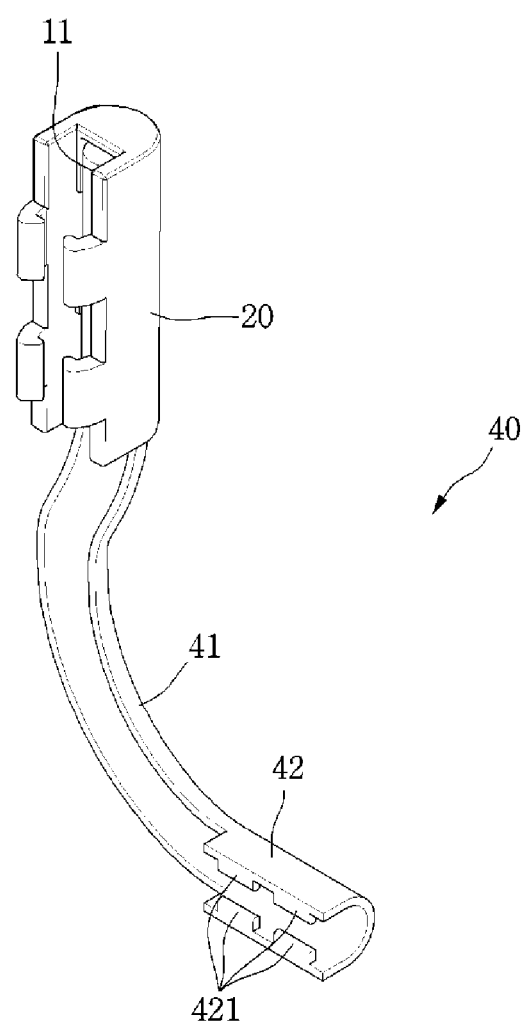
FIG. 6 is a front perspective view of a temperature sensing apparatus according to a second embodiment of the present disclosure.
Figure 7:
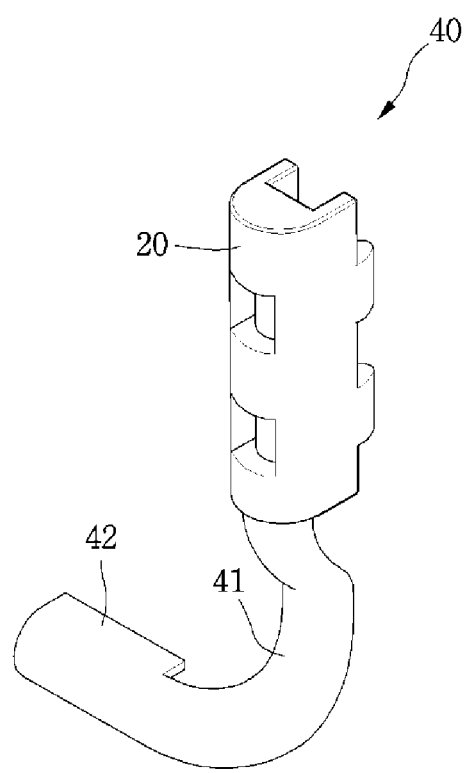
FIG. 7 is a rear perspective view of the temperature sensing apparatus according to the second embodiment of the present disclosure.

Referring to FIGS. 6 and 7, the temperature sensing apparatus 40 according to the second embodiment of the present disclosure may be installed at the outer circumferential surface of the refrigerant pipe which extends vertically, as illustrated in FIG. 1. The temperature sensing apparatus 40 may include the sensor bracket 20, a pipe cover 41 which extends along a shape of the refrigerant pipe 2 from a lower end of the sensor bracket 20 so as to cover a part of the refrigerant pipe 2, and a cover fixing part 42 which is formed at an end of the pipe cover 41 and fixed to the outer circumferential surface of the refrigerant pipe 2.

The sensor bracket 20 may be the same as the sensor bracket 20 forming the temperature sensing apparatus 10 according to the first embodiment. However, the cover 41 and the cover fixing part 42 are provided instead of the fixing hook 23. Therefore, like the first embodiment, the sensor bracket 20 forming the temperature sensing apparatus 40 according to the second embodiment identically includes the bracket body, the sensor accommodating groove, the drain hole and the pipe holder, and an accommodating part of the temperature sensor 11 is formed at the bracket body.

Since the sensor bracket 20 is installed at the outer circumferential surface of the refrigerant pipe which extends vertically, the sensor bracket 20 is vertically coupled to the refrigerant pipe 2. The pipe cover 41 extends from the lower end of the sensor bracket 20 while being bent along a curved shape of the refrigerant pipe 2. Because the pipe cover 41 is formed at a portion of the refrigerant pipe which is bent, the pipe cover 41 may be prevented from sliding down along the refrigerant pipe 2 by its own weight.

A plurality of fixing protrusions 421 protrudes from the cover fixing part 42. The plurality of fixing protrusions 421 is in contact with the outer circumferential surface of the refrigerant pipe 2. The fixing protrusions 421 are also located at an upper side of a point which divides the refrigerant pipe 2 into two equal parts, and prevents the cover fixing part 42 from being separated from the refrigerant pipe 2.

Since the pipe cover 41 is provided to have a shape which covers only a half of the refrigerant pipe 2, the pipe cover 41 may be separated from the refrigerant pipe 2 by an external force. However, since the cover fixing part 42 is provided to surround the outer circumferential surface of the refrigerant pipe 2, the pipe cover 41 may be prevented from being separated from the refrigerant pipe 2.

According to the temperature sensing apparatus for the heat exchanger as described above, the temperature sensing apparatus can be stably fixed to the refrigerant pipe, and thus the temperature sensing apparatus can be prevented from being rotated along the circumferential surface of the refrigerant pipe.

Since the condensate water formed on the surface of the refrigerant pipe is discharged through the drain hole formed at the temperature sensing apparatus, the malfunction possibility of the temperature sensing apparatus due to the water can be minimized.

A temperature sensing apparatus for a heat exchanger, may include a sensor bracket installed at an outer circumferential surface of a refrigerant pipe forming the heat exchanger, and a temperature sensor accommodated at an inside of the sensor bracket, and configured to be in contact with the outer circumferential surface of the refrigerant pipe when the sensor bracket is installed at the refrigerant pipe, to sense a surface temperature of the refrigerant pipe, wherein the sensor bracket includes a bracket body rounded to surround the outer circumferential surface of the refrigerant pipe, a sensor accommodating groove formed at an inner surface of the bracket body to be recessed and in which the temperature sensor is accommodated, and a pipe holder configured to protrude from an end of the bracket body and to be in close contact with the outer circumferential surface of the refrigerant pipe.

The temperature sensor may be formed in a cylindrical rod shape, and when the sensor bracket is installed at the outer circumferential surface of the refrigerant pipe, the temperature sensor may be in linear contact with the refrigerant pipe.

The temperature sensing apparatus may further include a fixing hook configured to extend from an edge of one side of the bracket body and hook on a frame of the heat exchanger to prevent the sensor bracket from being rotated in a circumferential direction of the refrigerant pipe while the sensor bracket is installed at the refrigerant pipe.

One or a plurality of drain holes through which water is discharged may be formed at a bottom of the bracket body.

The temperature sensing apparatus may further include a pipe cover configured to extend from an edge of one side of the bracket body along a shape of the refrigerant pipe to prevent the sensor bracket from being rotated in a circumferential direction of the refrigerant pipe while the sensor bracket is installed at the refrigerant pipe.

The temperature sensing apparatus may further include a cover fixing part formed at an end of the pipe cover and installed at the outer circumferential surface of the refrigerant pipe.

The pipe cover may be installed at the outer circumferential surface of the refrigerant pipe, which is bent, to cover only a part of the refrigerant pipe.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A temperature sensing apparatus for a heat exchanger, comprising:
   a sensor bracket provided at an outer circumferential surface of a refrigerant pipe of the heat exchanger; and
   a temperature sensor provided inside of the sensor bracket, and configured to be in contact with the outer circumferential surface of the refrigerant pipe when the sensor bracket is installed at the refrigerant pipe to sense a surface temperature of the refrigerant pipe, and
   wherein the sensor bracket includes:
   a bracket body configured to completely enclose the temperature sensor and partially surround the outer circumferential surface of the refrigerant pipe,
   a groove or a recess formed at an inner bottom surface of the bracket body to accommodate the temperature sensor, and
   at least one pipe holder protruding from the bracket body and configured to latch onto the outer circumferential surface of the refrigerant pipe, wherein the bracket body includes at least one drain hole penetrating the bracket body from the inner bottom surface to an outer bottom surface.

2. The temperature sensing apparatus according to claim 1, wherein the bracket body includes:
   a first end;
   a second end opposite the first end; and
   a pair of sidewalk that connect the first and second ends and are parallel to each other, wherein the at least one pipe holder includes a plurality of pipe holders, and the plurality of pipe holders protrudes from the pair of sidewalls of the bracket body, and wherein the sensor bracket further includes a fixing hook configured to extend from one of the first and second ends of the bracket body and hook onto a frame of the heat exchanger.

3. The temperature sensing apparatus according to claim 1, further comprising a pipe cover configured to extend from an end of the bracket body along a shape of the refrigerant pipe to prevent the sensor bracket from being rotated in a circumferential direction of the refrigerant pipe while the sensor bracket is installed at the refrigerant pipe.

4. The temperature sensing apparatus according to claim 3, further comprising a cover fixing part formed at an end of the pipe cover and provided at the outer circumferential surface of the refrigerant pipe.

5. The temperature sensing apparatus according to claim 4, wherein the pipe cover is provided at the outer circumferential surface of the refrigerant pipe, which is bent, to cover only a part of the refrigerant pipe.

6. The temperature sensing apparatus according to claim 2, wherein when the refrigerant pipe is horizontally bisected into an upper half and a lower half, the at least one pipe holder contacts the outer circumferential surface of the upper half of the refrigerant pipe, and the temperature sensor contacts the outer circumferential surface of the lower half of the refrigerant pipe.

7. The temperature sensing apparatus according to claim 1, wherein the groove or recess has a curvature corresponding to a curvature of the temperature sensor.

8. The temperature sensing apparatus according to claim 1, wherein the temperature sensor has a cylindrical rod shape and is in direct tangential contact with the outer circumferential surface of the refrigerant pipe and extends along an axial direction of the refrigerant pipe.

* * * * *